US 6,415,739 B1

(12) United States Patent
Orendorff et al.

(10) Patent No.: US 6,415,739 B1
(45) Date of Patent: Jul. 9, 2002

(54) COMBINATION FISH TANK AND PICTURE FRAME

(76) Inventors: James A. Orendorff, 1420 E. Tecoma Rd., Phoenix, AZ (US) 85048; Cory L. Amos, 367 Catherine Park, Glendora, CA (US) 91741

( * ) Notice: Subject to any disclaimer, the term of this patent is extended or adjusted under 35 U.S.C. 154(b) by 0 days.

(21) Appl. No.: 09/727,345

(22) Filed: Nov. 28, 2000

(51) Int. Cl.[7] ............................................. A01K 63/00
(52) U.S. Cl. .................. 119/248; 119/247; 119/253; 119/251; 119/257; 40/406; 40/722
(58) Field of Search .................. 119/248, 245, 119/246, 247, 253, 251, 255, 256, 257, 472, 500; 40/406, 611, 716, 720, 721, 124.2, 724, 722, 732, 764, 791, 765

(56) References Cited

U.S. PATENT DOCUMENTS

| | | | |
|---|---|---|---|
| 460,810 A | * 10/1891 | Gunther | |
| 1,777,944 A | 10/1930 | Trovato | |
| 1,974,068 A | 9/1934 | Greensaft | |
| 2,144,551 A | 1/1939 | Skolnick | |
| 2,814,895 A | * 12/1957 | Flam | |
| 3,276,428 A | 10/1966 | Burch | |
| 3,596,391 A | * 8/1971 | Knight, Jr. | 40/720 |
| 3,645,025 A | * 2/1972 | Giesecke | 40/734 |
| 3,771,246 A | * 11/1973 | Ebner | 40/720 |
| 3,956,837 A | 5/1976 | Itano | |
| 4,044,721 A | 8/1977 | Foley et al. | |
| 4,120,265 A | 10/1978 | Davis | |
| 4,136,638 A | 1/1979 | Fedor | |
| 4,144,664 A | 3/1979 | De Korte | |
| 4,269,142 A | 5/1981 | Hall | |
| 4,353,327 A | 10/1982 | Shroyer | |
| 4,687,575 A | 8/1987 | Grose | |
| 4,835,661 A | * 5/1989 | Fogelberg et al. | 362/97 |
| 4,837,955 A | 6/1989 | Grabhorn | |
| 4,879,824 A | * 11/1989 | Galloway | 40/763 |
| 5,003,921 A | 4/1991 | Tracy | |
| 5,078,093 A | 1/1992 | Flaherty | |
| 5,090,358 A | 2/1992 | Waldman | |
| 5,092,064 A | * 3/1992 | Lee | 40/406 |
| 5,172,650 A | * 12/1992 | Hsu et al. | 119/259 |
| 5,301,444 A | * 4/1994 | Horiuchi | 40/426 |
| 5,306,421 A | * 4/1994 | Weinstein | 210/151 |
| 5,438,959 A | 8/1995 | Stone et al. | |
| 5,546,289 A | 8/1996 | Gordon | |
| 5,626,747 A | * 5/1997 | Ritzow et al. | 210/169 |
| 5,706,760 A | 1/1998 | Chang | |
| 5,749,320 A | 5/1998 | Sydenstricker | |
| 5,761,838 A | * 6/1998 | Chisholm et al. | 40/716 |
| 5,800,027 A | * 9/1998 | Dunn | 312/138.1 |
| 6,131,318 A | * 10/2000 | Hsieh | 40/406 |
| 6,234,115 B1 | * 5/2001 | Blum et al. | 119/472 |

* cited by examiner

Primary Examiner—Yvonne R. Abbott
(74) Attorney, Agent, or Firm—Cislo & Thomas LLP

(57) ABSTRACT

A tank is combined with a picture frame. The tank has a housing with a recessed portion extending into the interior of the tank. The recessed portion is preferably unitarily formed in a front panel of the tank. The recessed portion is reinforced. The tank preferably has a flat bottom to be used on a table top, and has mounting brackets so it may be hung on a wall. The tank may serve as a fish tank, or other tank, and is preferably a clear plastic.

15 Claims, 3 Drawing Sheets

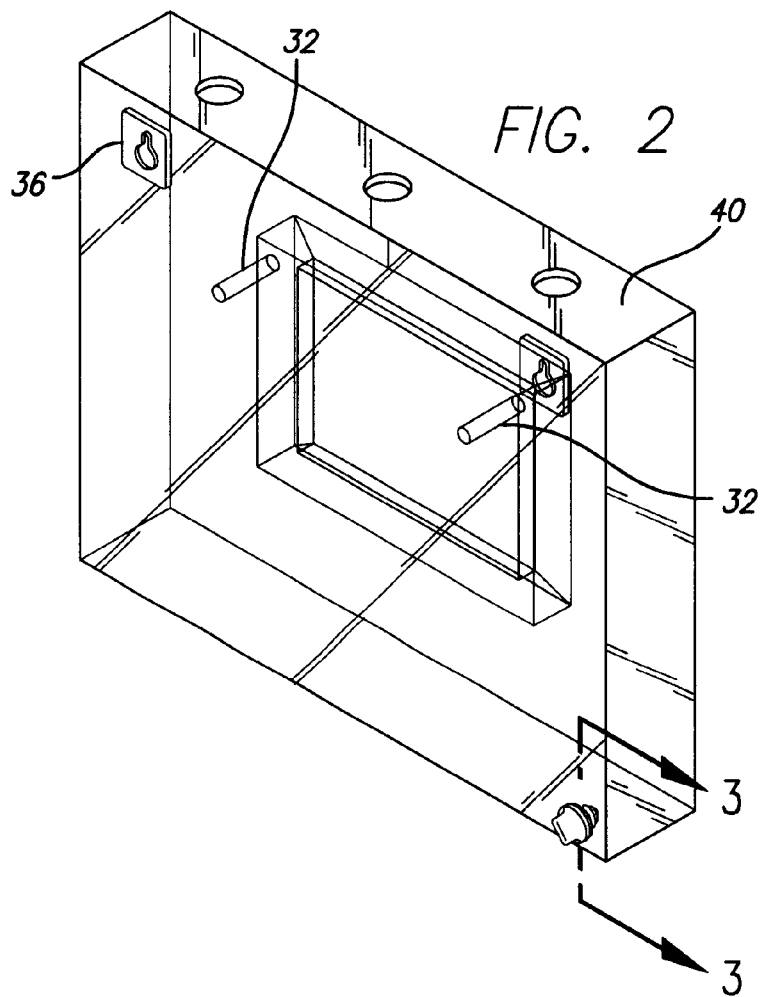
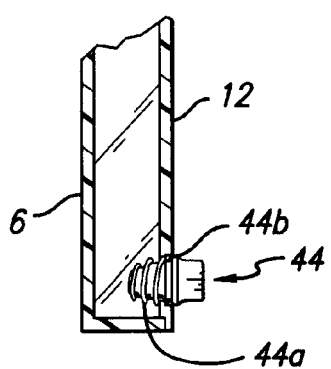
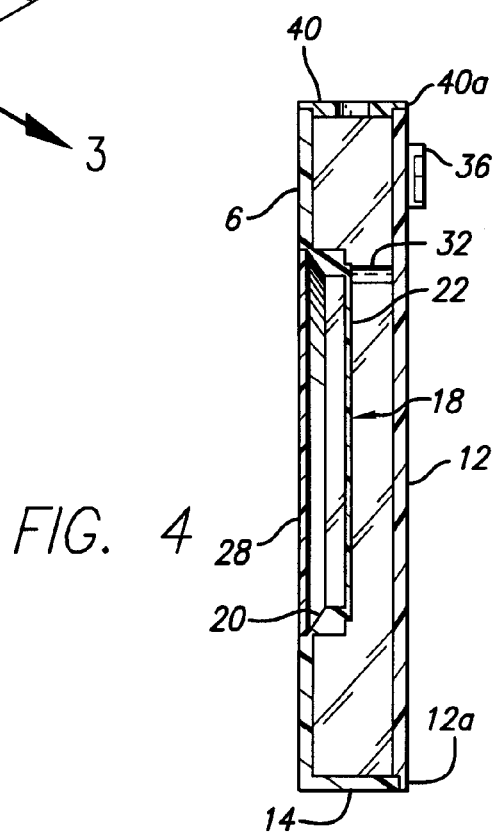

COMBINATION FISH TANK AND PICTURE FRAME

BACKGROUND OF THE INVENTION

1. Field of the Invention

This invention relates to a combination of a tank and a picture frame, and more particularly, a tank and picture frame combination in which the picture frame is recessed into the tank.

2. Description of the Related Art

Combinations of fish tanks, or other tanks, and frames have been known for a long time. Such combinations are a novelty. The idea of combining these two items is not new. For example, U.S. Pat. No. 4,136,638 to Fedor discloses a combination fish tank and picture frame where a picture holding frame is slid into grooves in front of a wall or panel of a fish tank. However, this structure does not integrate the picture and tank well and is somewhat complex.

U.S. Pat. No. 5,078,093 to Flaherty discloses a combination fish tank and picture frame where the picture is located in the middle of the tank. The picture frame is formed in the top of the tank and inserted inside the tank, so the picture is surrounded by water, fish, gravel, and/or vegetation, or other aquatic accessories. While this structure helps integrate the picture and tank, the picture can be distorted or obscured by the fish and water and also unduly divides the tank.

U.S. Pat. No. 5,706,760 to Chang discloses a fish tank which is made in a style that looks like a picture frame, but it is not actually a picture frame. It is only a tank. U.S. Pat. No. 5,438,959 also discloses a tank styled like a frame. These tanks do not provide for a picture.

There is also a company which markets a miniature tank. It is just a table top tank and does not provide for a picture.

What is needed is a combination tank and frame which is easy to manufacture and which has an effect like that achieved by putting a picture inside the tank yet the picture is not obstructed by the contents of the tank.

SUMMARY OF THE INVENTION

In one embodiment, the invention provides a tank having a housing with a front panel, side panels, a bottom panel and a rear panel. All of the panels are preferably attached by unitarily forming them, affixing them together, or a combination thereof, to achieve a watertight housing. The housing has an openable top panel press or friction fit on top.

The front panel has a recessed portion preferably formed unitarily therein such that a central portion of one main surface of the front panel tapers inward and forms a picture holding region. Because the picture is recessed into the tank, there is a three-dimensional effect achieved. Yet, the picture is not actually in the water and cannot be obscured by anything inside the tank.

In a preferred embodiment, the rear panel has two mounting brackets affixed thereto for wall mounting the tank, and a drain plug proximate the bottom panel. The recessed portion is reinforced, and a cover plate may be fitted over the picture. The tank is preferably a clear plastic such as Plexiglas™. The tank is preferably a fish tank, but may also be a terrarium, ant farm, or other tank.

BRIEF DESCRIPTION OF THE DRAWINGS

FIG. 2 is a rear perspective view of the tank of FIG. 1;

FIG. 3 is a vertical sectional view of a portion of the tank of FIG. 2 taken along a line 3—3 showing a drain plug;

FIG. 4 is a vertical sectional view of the tank of FIG. 1 taken along a line 4—4.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized.

Figure 1:
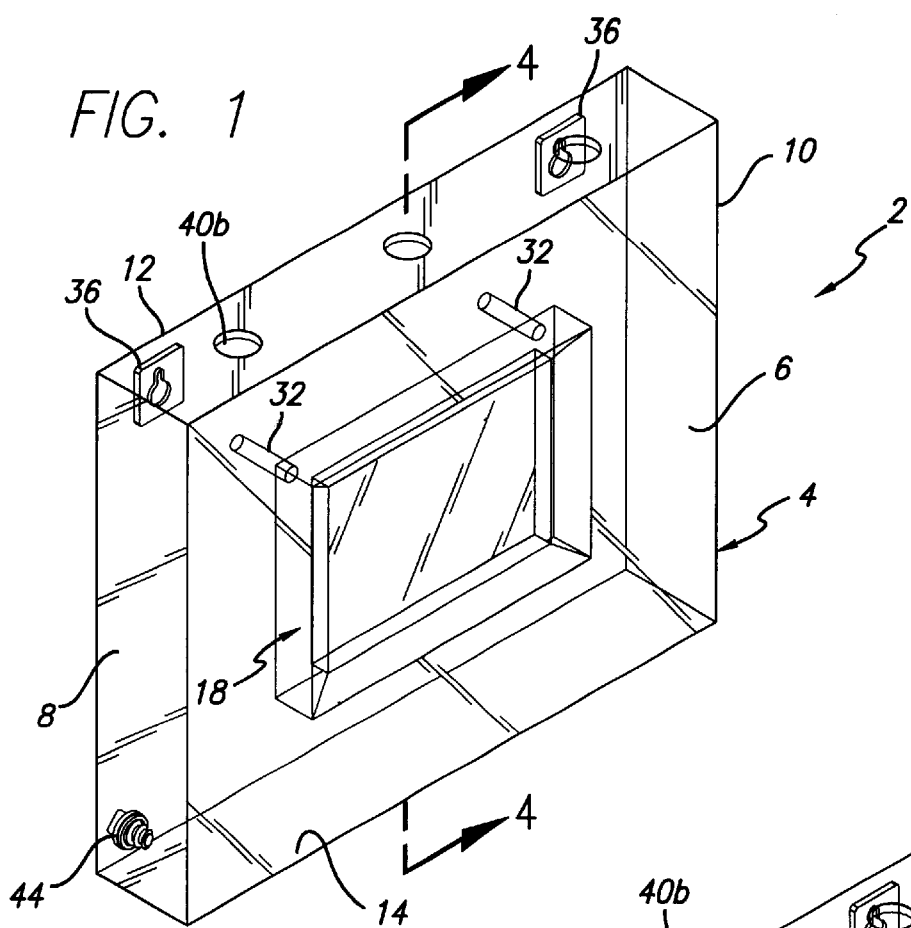
FIG. 1 is a front perspective view of a combination tank and picture frame to the invention.
Figure 5:
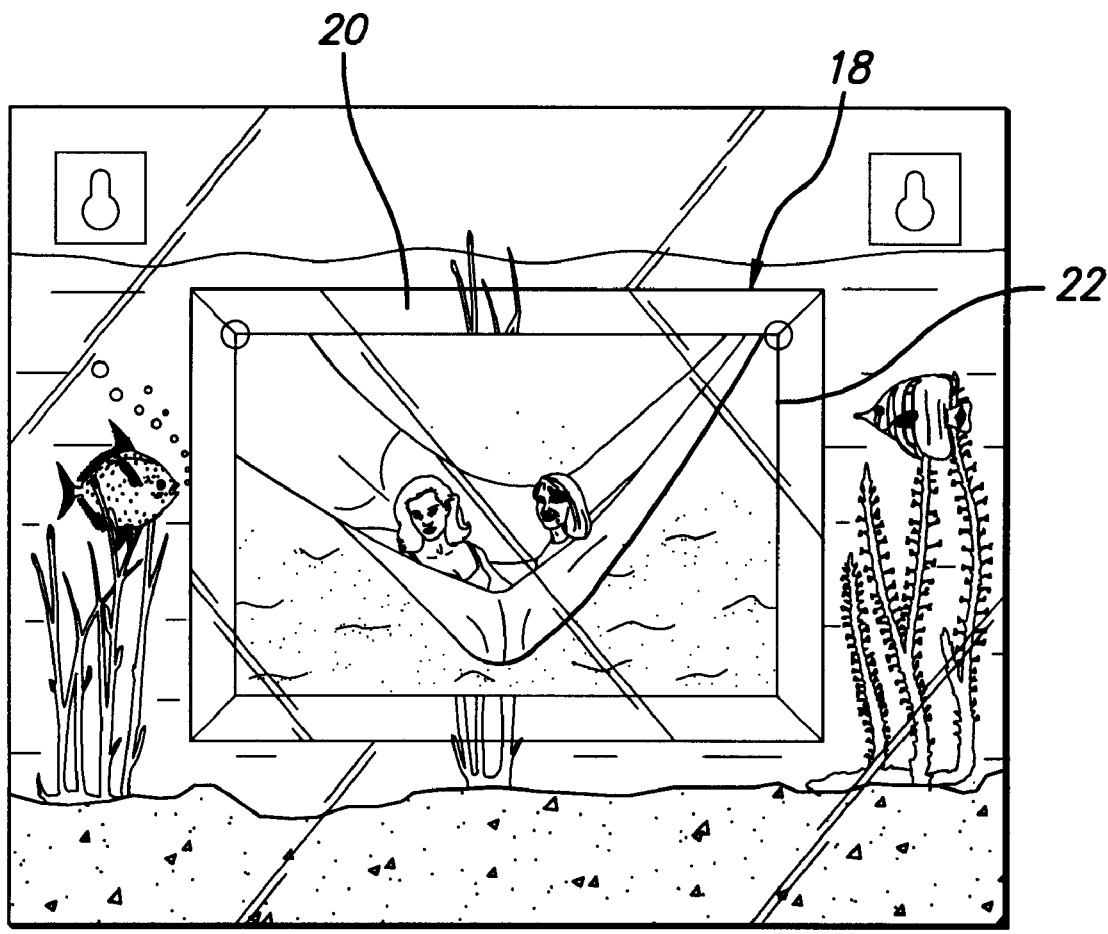
FIG. 5 is a front elevational view of the tank of FIG. 1A.

The invention provides a combination of a picture frame and tank. FIG. 1 shows tank 2 which has a housing 4 having a front panel 6, two side panels 8, 10, a rear panel 12, and a bottom panel 14. The front panel 6 has a recessed picture-holding portion 18 preferably formed unitarily with the front panel or epoxied thereto. With reference also to FIGS. 4 and 5, the picture-holding portion has tapered side walls 20 (or decorative), leading to a picture-holding flat wall 22. The flat wall is preferably rectangular and sized for a standard picture size, e.g., 3"×5", 4"×6" or 5"×7". A standard cardboard rectangular backing (not shown) may also be used. In addition, a clear cover plate 28 (FIG. 4) may be press fitted or friction fit or otherwise removably fit against the side walls 20 and/or front panel 6 (and positioned) over the picture-holding wall 20. Preferably, the front surface of the cover plate is flush with the outer surface of the front panel.

The cover plate is not necessary, and is not shown in the other figures for clarity's sake. The picture can be held in place by a small amount of glue, by friction, or other suitable means evident to those of ordinary skill in the art.

The recessed portion 18 is preferably reinforced. In FIGS. 2 and 4, two reinforcing rods 32 are affixed at one end to the back of the recessed picture-holding portion, e.g., at flat surface 20 near the top thereof and at the other end to the interior of the rear panel 12.

The tank preferably has a flat bottom panel 14 for resting on a table top. In addition, or in lieu thereof, the tank may have two wall mounting brackets 36 affixed to opposite sides of the rear panel near the top of the tank.

The tank has a removable or openable top 40 which may simply have notched edges 40a for mating with the side panels 3, 10, front panel 6 and rear panel 12 (FIG. 4). Alternatively, the top could be hinged to the rear panel. The top preferably has air holes formed therein, e.g., three holes 40b. In the case of an aquarium, the holes may also serve to provide easy access for feeding, or even a simple mechanism to grip and open the top.

As best shown in FIG. 3, the tank may also have a drain plug 44. A simple plug having a tapering threaded end 40a threads into a threaded hole in the rear panel 12. An o-ring 40b helps ensure a good seal.

Figure 1A:
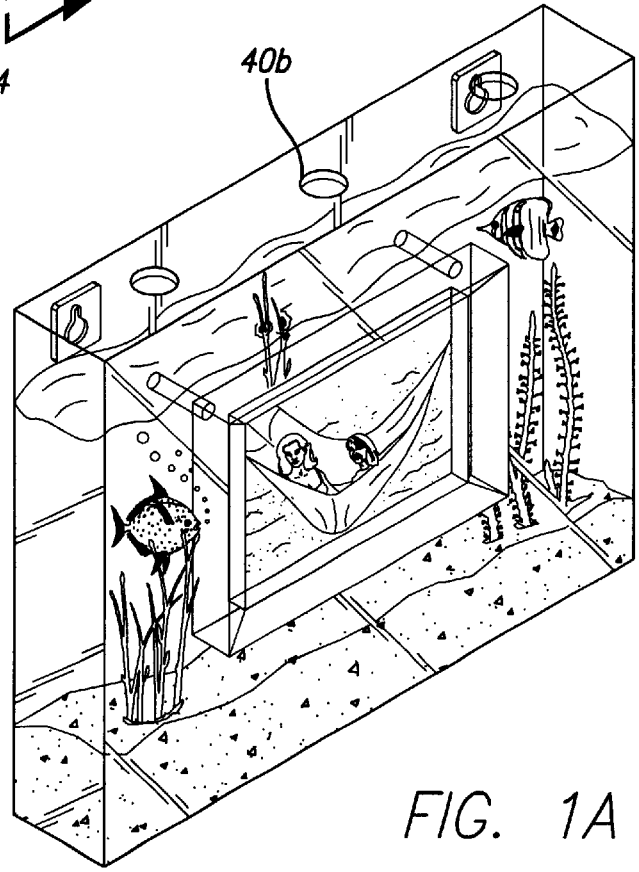
FIG. 1A is the same view as FIG. 1 but where the tank is a fish tank with water, fish, plants, gravel, and a picture.

In a preferred embodiment, the housing and all other elements except the o-ring are plastic, e.g., a thermoplastic such as Plexiglas™, and are clear. However, the tank could be made of glass, or another plastic, and some elements could be clear and others opaque or translucent. Moreover, the tank, while preferably a fish tank as shown in FIGS. 1A and 4, may also be a terrarium, ant farm, or other tank. Regardless of its use, the tank and picture frame gives a unique, three dimensional effect. The recessed picture holding portion is preferably such that the picture will be recessed into the tank's interior substantially beyond the interior wall of the front panel, e.g., about one third the thickness of the tank.

The housing may be made in two pieces. The front panel and recessed portion, including the reinforcing rods, the side panels and the bottom panel may be molded in one piece and the rear panel may be molded in another piece and epoxied to the reinforcing rods, side panels and bottom panel. FIG. 4 shows the rear panel with notched edges 12a, which are at the bottom and side edges. Alternatively, the front panel may be molded in one piece, and the rear panel, side panels and bottom panel may be molded in another piece, with or without the reinforcing rods, and then the two pieces are epoxied together. All panels and the rods could be molded separately and epoxied together too.

Preferred dimensions of the tank are 11" wide by 9" tall by 2" deep. However, the tank size may be varied depending on aesthetic or other factors as desired.

The disclosed embodiment is illustrative of the invention and is not intended to be exhaustive. For example, the drain plug may be a drain valve, or no valve need be provided. Also, the recessed picture-holding portion may have side walls that are stepped so that the frame can accommodate two or more different standard sized of pictures, e.g., 3"x5" and 4"x6".

What is claimed is:

1. A tank comprising:
   a housing having an interior and an exterior including a front panel, wherein the front panel has an exterior surface and an interior surface, and a recessed portion, extending into the interior of the housing, for holding a photographic picture, wherein the tank further comprises a clear cover plate for the recessed portion, the cover plate being fitted flush with the exterior surface of the front panel.

2. The tank of claim 1 wherein the housing has a rectangular shape, and further comprises a bottom panel, left and right side panels, and a rear panel.

3. The tank of claim 1 wherein the housing further comprises a removable top panel.

4. The tank of claim 1 wherein the tank is a fish tank.

5. The tank of claim 1 wherein the front panel is unitarily formed with the recessed portion.

6. The tank of claim 1 further comprising a drain plug.

7. The tank of claim 1 wherein the housing comprises a clear thermoplastic material.

8. The tank of claim 1 wherein the housing has a rear panel opposite the front panel, and the housing is unitarily formed except for the rear panel.

9. The tank of claim 1 further comprising means for reinforcing the recessed portion fixed to the housing.

10. The tank of claim 1 wherein the tank has a rear panel opposite the front panel and the recessed portion extends about one-third a distance from the front panel to the rear panel.

11. A tank comprising:
    a housing having an interior and an exterior including a front panel, wherein the front panel has an exterior surface and an interior surface, and a recessed portion, extending into the interior of the housing, for holding a photographic picture, wherein the recessed portion comprises beveled side walls contiguous with the front panel and a flat picture-holding panel contiguous with the beveled side walls.

12. The tank of claim 11 wherein the flat picture-holding panel is rectangular and has approximate dimensions selected from the group of 3"x5", 4"x6" and 5"x7".

13. A tank comprising:
    a housing having an interior and an exterior including a front panel, wherein the front panel has an exterior surface and an interior surface, and a recessed portion, extending into the interior of the housing, for holding a photographic picture, wherein the housing further comprises a rear panel opposite the front panel, and mounting means on the rear panel for mounting the tank to a wall;
    wherein the tank further comprises a clear cover plate for the recessed portion, the cover plate being fitted flush with the exterior surface of the front panel.

14. A tank comprising:
    a generally rectangular housing having a front panel, a rear panel, a flat bottom panel, and left and right side panels, the front panel having a recessed portion defining a picture frame, wherein the recessed portion extends into an interior of the tank, and the front panel is unitarily formed with the recessed portion, wherein the tank is a fish tank comprising a clear plastic, there is a top having air holes formed therein and the bottom panel is flat.

15. A tank comprising:
    a generally rectangular housing having a front panel, a rear panel, a flat bottom panel, and left and right side panels, the front panel having a recessed portion defining a picture frame, wherein the recessed portion extends into an interior of the tank, and the front panel is unitarily formed with the recessed portion, wherein the recessed portion comprises beveled side walls contiguous with a main surface of the front panel and a flat rectangular picture-holding panel contiguous with the side walls.

* * * * *